(12) United States Patent
Kim et al.

(10) Patent No.: US 8,652,559 B2
(45) Date of Patent: *Feb. 18, 2014

(54) METHOD FOR PREPARING ASEPTIC PACKAGED INSTANT WET SCORCHED RICE

(75) Inventors: Jong-Wook Kim, Seoul (KR); Chang-Yong Lee, Seoul (KR)

(73) Assignee: CJ Cheiljedang Corp., Seoul (KR)

( * ) Notice: Subject to any disclaimer, the term of this patent is extended or adjusted under 35 U.S.C. 154(b) by 8 days.

This patent is subject to a terminal disclaimer.

(21) Appl. No.: 13/132,936

(22) PCT Filed: Dec. 2, 2009

(86) PCT No.: PCT/KR2009/007144
§ 371 (c)(1),
(2), (4) Date: Jul. 25, 2011

(87) PCT Pub. No.: WO2010/064840
PCT Pub. Date: Jun. 10, 2010

(65) Prior Publication Data
US 2011/0274815 A1 Nov. 10, 2011

(30) Foreign Application Priority Data
Dec. 5, 2008 (KR) .................... 10-2008-0123356

(51) Int. Cl.
*A23L 1/40* (2006.01)
(52) U.S. Cl.
USPC .......................................... 426/589; 426/618
(58) Field of Classification Search
USPC ................................................. 426/589, 618
See application file for complete search history.

(56) References Cited

FOREIGN PATENT DOCUMENTS

| KR | 1019830002843 B1 | 2/1987 |
| KR | 1019870009919 B1 | 9/1989 |
| KR | 1019930000934 B1 | 9/1995 |
| KR | 1020020029037 A | 4/2002 |
| KR | 1020030029532 A | 4/2003 |
| KR | 100605488 B1 | 7/2006 |
| KR | 100748268 B1 | 8/2007 |

*Primary Examiner* — Rena Dye
*Assistant Examiner* — Chaim Smith
(74) *Attorney, Agent, or Firm* — Porzio, Bromberg & Newman, P.C.

(57) ABSTRACT

The present invention relates to a method for preparing aseptic packaged instant wet scorched rice, which mixes roasted rice, polished rice, and dried scorched rice, sterilizes the mixture, and adds a concentrate extracted from roasted rice, a polygonatum concentrate, and rice cooking water with a rice starch to the mixture to produce wet scorched rice. Subsequently, the thus-produced wet scorched rice is sealed in an aseptic condition, steamed, and cooled to produce aseptic packaged instant wet scorched rice. As the aseptic packaged instant wet scorched rice prepared according to the method of the present invention is sterilized, the rice can be preserved over 6 months or longer at room temperature. Further, the flavor of the roasted rice and the scorched rice is diffused to maximize the unique flavor of the scorched rice. The starch of the scorched rice is eluted to the rice cooking water to provide a predetermined turbidity and to enrich the flavor of the scorched rice. The scorched rice of the present invention is well softened, and has the unique texture of scorched rice. Therefore, the scorched rice of the present invention has a superior quality rivaling that of homemade scorched rice, and can be preserved over a long period of time.

4 Claims, 1 Drawing Sheet

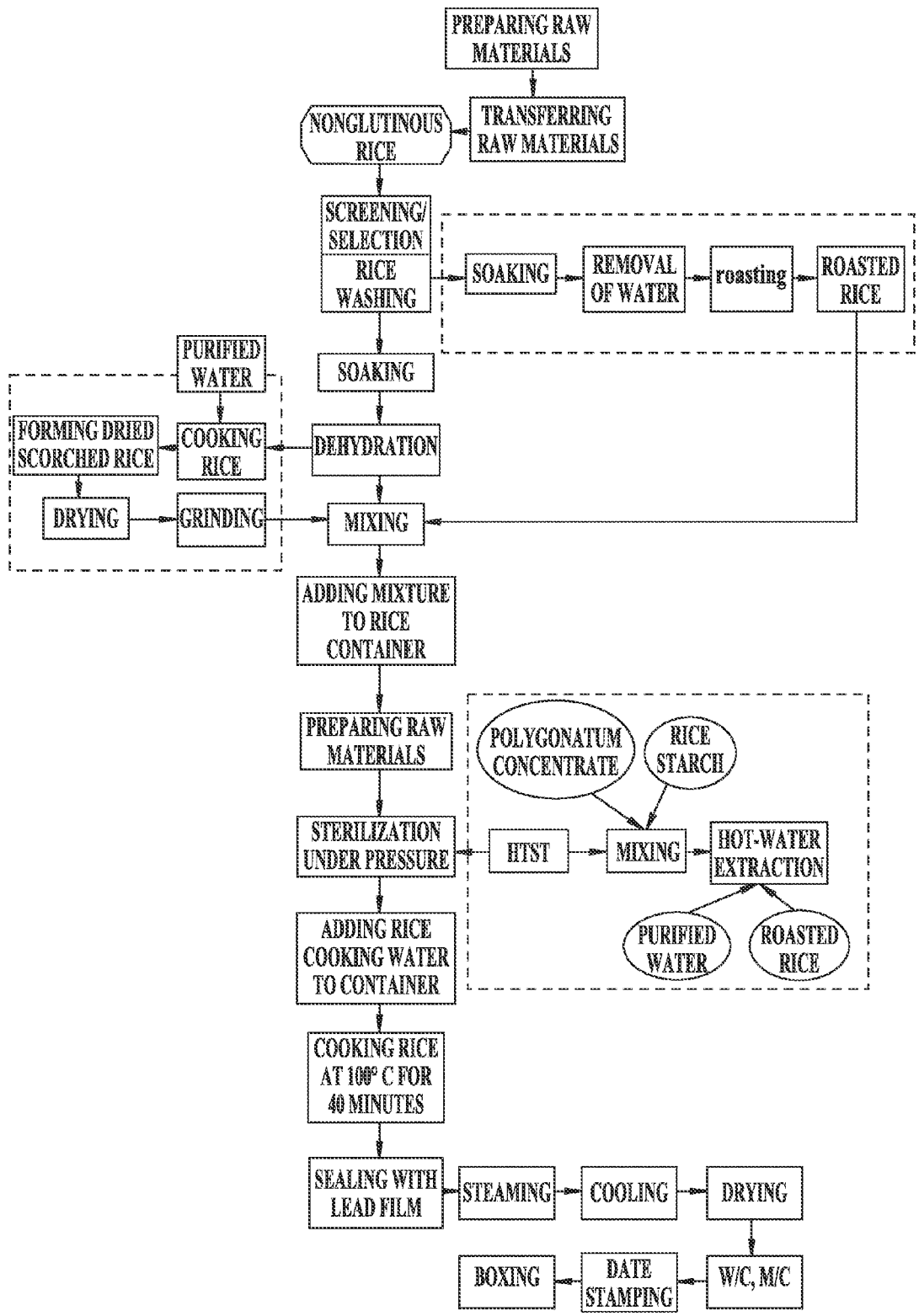

METHOD FOR PREPARING ASEPTIC PACKAGED INSTANT WET SCORCHED RICE

CROSS REFERENCE TO RELATED APPLICATION

This is a National Stage of International Application No. PCT/KR2009/007144, filed Dec. 2, 2009, which claims the benefit of Application No. 10-2008-0123356, filed in Korea on Dec. 5, 2008, the disclosures of which Applications are incorporated by reference herein.

TECHNICAL FIELD

The present invention relates to a method for preparing aseptic packaged instant wet scorched rice. More specifically, the present invention relates to a method for preparing aseptic packaged instant wet scorched rice, comprising sterilizing a mixture of roasted rice, scorched rice and polished rice, adding rice cooking water containing a concentrate extracted from the roasted rice, polygonatum (Solomon's seal) concentrate and rice starch thereto to prepare wet scorched rice (water content: 55 to 60% by weight), and sealing the wet scorched rice in an aseptic condition, followed by steaming and cooling to prepare instant packaged wet scorched rice.

BACKGROUND ART

Generally, scorched rice soup (also called "Nurungji Tang" in Korean) is prepared by adding a predetermined amount of water to scorched rice formed after cooking rice and then boiling the mixture at 100° C. for 10 minutes or longer.

There are a variety of conventional methods for preparing scorched rice soup. For example, methods for preparing instant (precooked) scorched rice or dry-type scorched rice that can be eaten only after heating are disclosed in KR Patent Application Nos. 10-1974-1979, 10-1983-2843, 10-1984-6509, 10-1987-9919, 10-1990-18920, and 10-1991-22412. In addition, KR Patent Application No. 10-1993-934 discloses a method for preparing instant rice soup (also called "Sungnyung" in Korean) comprising steaming a rice or cereal mixture in an automatic rice cooker, molding scorched rice obtained thereby using a scorched rice molder, soaking the scorched rice in tepid water, followed by rapid freeze-drying such that water content is adjusted to 80 to 90 wt %, vacuum-dying, such that water content is adjusted to 5 wt % or less and vacuum packaging.

In addition, KR Patent Application No. 10-2003-9247 discloses concentrated rice soup which is concentrated, sterilized and packaged in order to obtain rice soup in home by adding hot water thereto, and KR Utility Model Application 20-2005-3671 discloses an instant rice soup product prepared by mixing water, polished rice and brown rice, homogeneously heating the mixture to a temperature of 140 to 180° C. to simultaneously perform steaming and roasting, and naturally drying.

The conventional dry-type scorched rice which can be eaten by adding boiling water thereto exhibits a deterioration in taste such as texture or flavor, as compared to homemade scorched rice soup. The dry-type scorched rice which can be eaten by adding water thereto, followed by boiling also has unsatisfactory qualities in terms of flavor and texture, although it exhibits superior quality as compared to the previous case.

Accordingly, the scorched rice soup prepared in accordance with a conventional method has disadvantages of being highly perishable and having poor taste.

As a result of a great deal of intensely repeated research and experiments to overcome the disadvantages, the inventors of the present invention discovered a method for preparing scorched rice which satisfies superior qualities such as taste, flavor and texture.

DISCLOSURE

Technical Problem

Therefore, the present invention has been made in view of the above problems, and it is one object of the present invention to provide a method for preparing instant packaged wet scorched rice having water content of 55 to 60% by weight using roasted rice, dried scorched rice and polished rice, as raw materials, wherein product safety is secured in the process of aseptic packaging, thus exhibiting superior texture and unique flavor and enabling storage for a long period of time.

Technical Solution

In accordance with an aspect of the present invention, the above and other objects can be accomplished by the provision of a method for preparing aseptic packaged instant wet scorched rice which can be stored at room temperature for a long period of time of 6 months or longer, exhibits superior resistance to microorganisms and renders inherent flavors of scorched rice soup, the method comprising: roasting a mixture of polished rice and brown rice to prepare roasted rice; washing polished rice and soaking the polished rice in water; mixing the roasted rice and polished rice and dried scorched rice, followed by sterilizing, adding 1.2% by weight (based on the weight of rice cooking water) of polygonatum (Solomon's seal) and 1.5% by weight (based on the weight of rice cooking water) of rice starch to a concentrate obtained by hot water extraction of the roasted rice and subjecting the same to HTST (high temperature short time) sterilization to prepare rice cooking water, and adding the rice cooking water to a mixture of the sterilized roasted rice, polished rice and dried scorched rice to prepare wet scorched rice having a water content of 55% to 60% by weight, and sealing in an aseptic condition after rice cooking is completed, followed by steaming and cooling to prepare instant packaged scorched rice.

The term "polished rice" as used herein refers to rice obtained by milling brown rice to a milling degree of 12 or higher.

The term "brown rice" as used herein refers to rice obtained by removing chaff from rice grains and milling the residue to a milling degree of 7 to 8.

The term "roasted rice" as used herein refers to rice having a water content of 5% by weight of lower, obtained by washing nonglutinous rice with water, soaking the same in water for one hour, removing the water and roasting polished rice with salt in a roster.

The term "dry-type scorched rice" refers to scorched rice having a water content of less than 9% by weight, obtained by washing polished rice with water, soaking the same in water for one hour, cooking rice having water content of 63% by weight in a rice cooker and molding the rice.

The term "washing rice" as used herein refers to a process for washing rice.

The term "soaking" as used herein refers to a process of macerating rice.

Hereinafter, the method of the present invention will be described in detail according to respective steps with reference to FIG. 1.

First, as shown in FIG. 1, nonglutinous rice was soaked in water for one hour, the moisture was removed therefrom and polished rice was roasted with salt in a roaster to prepare roasted rice having a water content of 5% by weight or lower. Preferably, the roasting is carried out at 130 to 145° C. for 15 to 30 minutes.

Then, polished rice is washed with purified water, starch and other impurities present on the surface of rice grains are removed, the washed rice is soaked in water for one hour, and the washed rice is placed in a container such as a fine wire mesh to remove water therefrom.

In addition, the polished rice is washed with water, soaked in water for one hour, cooking rice having a water content of 63% by weight in a rice cooker and cooking scorched rice having a water content of less than 9% by weight in a scorched rice molder.

The roasted rice treated under predetermined conditions, soaked polished rice and dried scorched rice are mixed and the mixture is placed in a heat-resistant plastic container. Preferably, a mix ratio of the soaked rice, roasted rice and dried scorched rice is 5:1:2.

The container containing the roasted rice, polished rice and dried scorched rice is sterilized 7 to 8 times using a high-temperature high-pressure (HTHP) sterilizer at a temperature of, preferably, 140° C. or higher, more preferably, at a temperature of 140 to 143° C. for 4.5 to 5.0 seconds, to eliminate microorganisms present in rice materials. When sterilization conditions are excessively severe, rice soup loses its inherent flavor. Accordingly, suitable control of sterilization conditions is required.

Then, separately, roasted rice is hot-water extracted using purified water at 80 to 90° C. for 30 minutes, mixing 1.2% by weight (based on rice cooking water) of polygonatum (Solomon's seal) and 1.5% by weight (based on the weight of rice cooking water) of rice starch with the extract, filtering the mixture and sterilizing the filtered material in an HTST (high temperature short time) sterilizer (Shinsung chemical Co., Ltd.) to prepare rice cooking water.

After sterilization is completed, a predetermined amount of rice cooking water is placed in a container containing roasted rice, polished rice, and dried scorched rice (water content of final product: 55 to 60 wt %). The rice cooking is performed in the container containing rice cooking water at a steam temperature of 100° C. for 30 minutes. At this time, inherent flavors of the roasted rice and the dried scorched rice are maximized, and starch is eluted from the rice into the rice cooking water. The rice starch further added to the rice cooking water imparts inherent turbidity of scorched rice soup, when scorched rice soup is cooked in a microwave.

When cooking is completed, the rice was sealed with lead film in a clean room (class 100 or less, "clean room standard" according to NASA, wherein the number of particles having a diameter of 0.5 μm or more is 100 in 1 ft$^3$), steamed, cooled and dried to obtain a final scorched rice product.

The aseptic instant packaged scorched rice can be stored at room temperature for a long period of 6 months or longer.

Advantageous Effects

The aseptic packaged instant wet scorched rice prepared according to the method of the present invention can be preserved for 6 months or longer at room temperature via a sterilizing process. Further, the flavor of the roasted rice and the scorched rice is diffused to maximize the unique flavor of the scorched rice. The starch present in rice and further added rice starch remain on the surface of scorched rice. Accordingly, when heated in water in a microwave for rice cooking, the starch of the scorched rice is eluted to the rice cooking water to provide a predetermined turbidity and to enrich the flavor of the scorched rice. The scorched rice soup exhibits inherent excellent flavor, superior spreading and soft texture. Accordingly, the scorched rice soup exhibits superior qualities, comparable to traditional homemade scorched rice soup and can be stored for a long period of time, thus being considerably useful for the food industry.

DESCRIPTION OF DRAWINGS

The above and other objects, features and other advantages of the present invention will be more clearly understood from the following detailed description taken in conjunction with the accompanying drawings, in which:

FIG. 1 is a flow chart illustrating a method for preparing an aseptic instant packaged wet scorched rice using roasted rice.

BEST MODE

Now, the present invention will be described in more detail with reference to the following Examples. These examples are only provided to illustrate the present invention and should not be construed as limiting the scope and spirit of the present invention.

Example 1

200 g of polished rice was washed five times with water, soaked in water for one hour and placed in a fine wire mesh to remove moisture therefrom. 160 g of water was added to 200 g of the polished rice and the mixture was heated for 30 minutes to prepare scorched rice. 20 g of the scorched rice thus prepared, 20 g of cooked rice and 230 g of water were heated for 10 minutes to prepare scorched rice soup.

Example 2

200 g of polished rice was washed five times with water, soaked in water for one hour and placed in a fine wire mesh to remove moisture therefrom. 230 g of water was added to a rice cooker to cook rice having a water content of 60 to 62% by weight and scorched rice having a water content of less than 9% and a thickness of less than 5 mm was cooked in a scorched rice molder. The resulting rice was dried at room temperature (25° C.) for 4 hours and grinded to a predetermined size of width×length×height: 15 mm×10 mm×5 mm 300 g of 100° C. boiling water was added to 60 g of the grinded scorched rice and allowed to stand for 5 minutes to prepare scorched rice soup.

Example 3

800 g of water was added to 60 g of a mixture (7:3) of the scorched rice prepared in Example 2 and white rice to prepare the scorched rice and the mixture was heated at 100° C. for 10 minutes to prepare scorched rice soup.

Example 4

The polished rice and brown rice were roasted with salt at 130 to 145° C. to obtain roasted rice. Dried scorched rice was obtained in the same manner as in Example 2. Finally, 200 g of the polished rice was washed five times with purified water to remove starch and other impurities present thereon, soaked in water for one hour and placed in a fine wire mesh to remove moisture therefrom.

35 g of the soaked rice, 7 g of roasted rice and 14 g of scorched rice were placed in a container, sealed in a high temperature short-time sterilizer (available from SHINWA Co., Ltd.), and high-pressure vapor was blown therein and sterilized at a temperature of 140 to 143° C. for 5.0 seconds. The high-temperature vapor sterilization process was repeated 7 times.

2,000 g of water was added to 50 g of the roasted rice washed in a separate process, followed by hot-water extraction at 90° C. for 30 minutes. 1.2% by weight (based on the weight of rice cooking water) of polygonatum (Solomon's seal) and 1.5% by weight (based on the weight of rice cooking water) of rice starch were added to the extracted solution and were subjected to HTST sterilization at 130° C. for 20 seconds to prepare rice cooking water.

After sterilization under high-temperature vapor was completed, 230 g of rice cooking water was added to the sterilized container and allowed to stand in a rice cooker under vacuum at 100° C. for 30 minutes to prepare wet scorched rice.

After rice cooking was completed, the rice was sealed with a lead film under aseptic conditions, allowed to stand for about 12 minutes to steam rice and cooled in water at 10° C. for 15 minutes to complete preparation of wet scorched rice product.

200 g of water was added to the aseptic packaged wet scorched rice, followed by cooking in a microwave for 3 minutes to prepare scorched rice soup.

Experimental Example 1

Property tests were performed for scorched rice soups prepared in Examples 1 to 4. The results thus obtained are shown in Table 1 below and FIG. 2.

TABLE 1

|  | Taste | Texture | Color and gloss | Appearance | Flavor | Eating convenience |
|---|---|---|---|---|---|---|
| Ex. 1 | 4.02 | 3.92 | 3.96 | 3.84 | 4.11 | 2.54 |
| Ex. 2 | 3.51 | 3.41 | 3.49 | 3.35 | 3.53 | 4.31 |
| Ex. 3 | 3.77 | 3.89 | 3.87 | 3.80 | 3.65 | 3.74 |
| Ex. 4 | 3.98 | 3.82 | 3.89 | 3.83 | 3.92 | 4.25 |
| P-value | **0.01 | **0.02 | **0.03 | **0.031 | **0.01 | **0.00 |

\*\*There is significant difference in CI 95 wt %
\*5-grade scale is used as the score of property test. That is, evaluation is made based on the following scores: very good: 5, good: 4, medium: 3, bad: 2, very bad: 1

Example 1 shows scorched rice soup prepared by a traditional method, which exhibits inherent unique aromatic smell of rice soup, superior texture of rice grains and the most superior inherent flavor of rice soup.

Example 2 shows scorched rice soup eaten after adding boiling water to instant dry-type scorched rice, which exhibits high consumer taste in terms of superior convenience. However, it can be seen that scorched rice soup of Example 2 exhibits a hard and tough texture due to insufficient gelatinization and considerably deteriorated flavor, as compared to the unique flavor of scorched rice.

The scorched rice soup of Example 3 is obtained by heating instant scorched rice and rice for about 10 minutes, which exhibits superior texture, comparable to scorched rice soup of Example 1, due to sufficient gelatinization of scorched rice. However, the scorched rice soup of Example 3 exhibits flavor comparable to the scorched rice soup of Example 2.

The scorched rice soup of Example 4 prepared in accordance with the method of the present invention exhibits texture and flavor comparable to scorched rice soup of Example 1. The scorched rice soup of Example 4 exhibits good consumer taste in terms of cooking method, which is comparable to scorched rice soup of Example 2.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A method for preparing aseptic packaged instant wet scorched rice comprising:
    a) washing polished rice with water and soaking the washed rice in water to prepare soaked rice;
    b) roasting polished rice to prepare roasted rice;
    c) preparing dried scorched rice, followed by grinding;
    d) mixing the soaked rice prepared in step a), the roasted rice prepared in step b) and the dried scorched rice obtained in step c), followed by sterilizing the mixture in a container;
    e) contacting the roasted rice separately with purified water at 80-90° C. such that an extract comes out of the roasted rice and into the water, adding polygonatum concentrate and rice starch to the water with the extract, followed by HTST (high temperature short time) sterilization of the water with the extract to prepare rice cooking water;
    f) adding the rice cooking water to the sterilized mixture obtained in step d) and then cooking wet scorched rice;
    g) sealing the wet scorched rice under aseptic conditions, followed by steaming and cooling to prepare instant packaged wet scorched rice.

2. The method according to claim 1, wherein the wet scorched rice has a water content of 55 to 60% by weight.

3. The method according to claim 1, wherein, in step d), a mix ratio of the soaked rice, roasted rice, and dried scorched rice is 5:1:2.

4. The method according to claim 1, wherein, in step e) the polygonatum concentrate and the rice starch are added 1.2% and 1.5% by weight of the rice cooking water, respectively.

* * * * *